US010742417B2

(12) United States Patent
Alzahrani et al.

(10) Patent No.: US 10,742,417 B2
(45) Date of Patent: Aug. 11, 2020

(54) SECURED BIOMETRIC SYSTEMS AND METHODS

(71) Applicants: King Abdulaziz University, Jeddah (SA); The Regents of the University of Colorado, a body corporate, Denver, CO (US)

(72) Inventors: Bayan Taha Alzahrani, Jeddah (SA); Fahad Jazi Alsolami, Jeddah (SA); Terrance E. Boult, Colorado Springs, CO (US)

(73) Assignees: King Abdulaziz University, Jeddah (SA); The Regents of the University of Colorado, a body corporated, Denver, CO (US)

( * ) Notice: Subject to any disclaimer, the term of this patent is extended or adjusted under 35 U.S.C. 154(b) by 106 days.

(21) Appl. No.: 16/166,282

(22) Filed: Oct. 22, 2018

(65) Prior Publication Data
US 2020/0127839 A1  Apr. 23, 2020

(51) Int. Cl.
H04L 9/32         (2006.01)
G06K 9/00        (2006.01)
G06F 21/60       (2013.01)
H04L 29/08       (2006.01)
(Continued)

(52) U.S. Cl.
CPC .......... *H04L 9/3231* (2013.01); *G06F 16/13* (2019.01); *G06F 21/32* (2013.01); *G06F 21/602* (2013.01); *G06K 9/00013* (2013.01); *G06K 9/00073* (2013.01); *G06K 9/00093* (2013.01); *H04L 67/1097* (2013.01)

(58) Field of Classification Search
CPC ... H04L 9/3231; H04L 67/1097; G06F 16/13; G06F 21/602; G06F 21/32; G06K 9/00073; G06K 9/00013; G06K 9/00093
See application file for complete search history.

(56) References Cited

U.S. PATENT DOCUMENTS 7,564,997 B2   7/2009  Hamid
7,773,784 B2   8/2010  Boult
8,538,096 B2   9/2013  Bolle et al.
(Continued)

OTHER PUBLICATIONS

A. K. Jain, J. Feng and K. Nandakumar, "Fingerprint Matching," in Computer, vol. 43, No. 2, pp. 36-44, Feb. 2010.*

*Primary Examiner* — Neil R McLean
(74) *Attorney, Agent, or Firm* — Oblon, McClelland, Maier & Neustadt, L.L.P.

(57) ABSTRACT

A fingerprint characterizing system and method include receiving a fingerprint image at a fingerprint module; extracting a plurality of minutiae points from the fingerprint image, via a fingerprint image sensor; generating a minutiae file of biometric data according to a corresponding location of the plurality of minutiae points on the fingerprint image; generating a pair table from the minutiae file; dividing the pair table into a plurality of subsets; encrypting, via processing circuitry each of the plurality of subsets; comparing, via the processing circuitry each of the encrypted plurality of subsets against one or more existing encrypted subsets stored across a plurality of data clouds; and generating, via the processing circuitry a match table for each of the encrypted plurality of subsets and a corresponding compatible existing encrypted subset stored in the plurality of data clouds.

17 Claims, 9 Drawing Sheets

(51) Int. Cl.
*G06F 21/32* (2013.01)
*G06F 16/13* (2019.01)

(56) References Cited

U.S. PATENT DOCUMENTS

| | | | |
|---|---|---|---|
| 8,634,606 B2 | 1/2014 | Rane et al. | |
| 9,183,364 B2* | 11/2015 | Szoke | G06F 21/32 |
| 2018/0247105 A1* | 8/2018 | Riopka | G06T 7/44 |
| 2018/0260618 A1* | 9/2018 | Benini | G06K 9/6212 |
| 2019/0080330 A1* | 3/2019 | Schipperheijn | H04L 9/3228 |

* cited by examiner

SECURED BIOMETRIC SYSTEMS AND METHODS

BACKGROUND

Technical Field

Fingerprint recognition systems and methods are described herein. In particular, privacy and security of biometric data is described.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Fingerprint features used in a recognition system can be categorized into three types: orientation ridge flow, minutiae point, and ridge contour. See A. K. Jain, K. Nandakumar, and A. Ross, "50 years of biometric research: Accomplishments, challenges, and opportunities," *Pattern Recognit. Lett.*, vol. 79, pp. 80-105, August 2016, incorporated herein by reference in its entirety. A minutiae-based structure is a commonly used feature since the minutiae point has a unique structure that makes each fingerprint image distinct from others in the recognition system. Moreover, the minutiae point does not need alignment or specific features (e.g., delta or core). See A. K. Jain et al., incorporated herein by reference in its entirety.

A minutiae point indicates both the ridge bifurcation and ridge ending, wherein bifurcation is the point or area in which the ridge divides into two branches or parts, as illustrated in FIG. 1A. FIG. 1B illustrates a ridge ending indicated by a square and a bifurcation indicated by a circle. See C. I. Watson et al., *User's Guide to NIST Biometric Image Software (NBIS)*. 2007, incorporated herein by reference in its entirety.

The orientation and coordinate location of the ridge for all minutiae points need to be extracted to match the fingerprints. Minutiae Detection software (MINDTCT) has been used to extract the minutiae points and other details from the fingerprint images. See C. I. Watson et al., incorporated herein by reference in its entirety.

MINDTCT software takes the fingerprint image from the sensor and extracts all minutiae in the image. A minutiae file is created for each minutia point by assigning its location on the fingerprint image (x and y coordinates), the orientation angle ($\theta$), and the quality (q). See C. I. Watson et al., incorporated herein by reference in its entirety.

After creating the minutiae file for each minutiae point in the fingerprint image, an algorithm constructs a pair table from the minutiae files. FIG. 2 illustrates values of (dkj, $\beta 1$, $\beta 2$, k, j, $\theta$kj) from the minutiae files. See C. I. Watson et al., incorporated herein by reference in its entirety. The distance between the minutiae pair (k, j) is dkj, where $\beta 1$ and $\beta 2$ are the angles of each minutia with respect to the line between them, and $\theta$kj is the orientation of the line between the two minutiae points. See C. I. Watson et al., incorporated herein by reference in its entirety. The pair table stores the entries of the minutiae pair according to the distance between the minutiae pair (k, j) as dkj.

The algorithm matches pair tables between a probe (fingerprint image being tested) and a gallery (fingerprint images stored in a database). The algorithm compares each entry from the probe pair table against each entry of all gallery pair tables. See C. I. Watson et al., incorporated herein by reference in its entirety. The algorithm generates a match table for compatible entries between the probe and the gallery in which the distances and the angles between them are within a given threshold. See C. I. Watson et al., incorporated herein by reference in its entirety.

Each row in the match table includes one pair from a gallery fingerprint and the corresponding pair from a probe fingerprint, along with the difference in the angle between them. When the match table is created, the algorithm creates links between nodes by traversing into different rows in the table to form clusters, such as the NIST Bozorth algorithm or it creates trees instead of a graph, such as the Forest-Finger algorithm. See C. I. Watson et al.; and A. Z. Bendale, "Forestfingers: Multi-fingerprint Recognition Without Segmentation," Citeseer, 2009, each incorporated herein by reference in their entirety. The algorithm uses the clusters/trees to compute a final score of matching to determine if both the gallery fingerprint image and the probe fingerprint image are related to the same person or not. See C. I. Watson et al.; and A. Z. Bendale, each incorporated herein by reference in their entirety.

Biometric data plays an important role today as an identity authentication tool. However, designing an efficient and secure biometrics authentication scheme in a cloud environment remains a challenge. It is therefore one object of the present disclosure to provide a secure and effective method and system for characterizing, analyzing, and/or identifying a fingerprint that may optionally be implemented in a cloud environment.

SUMMARY

In an exemplary embodiment, a fingerprint characterizing system and method include extracting a first plurality of minutiae points from a first fingerprint image, via a fingerprint image sensor; generating a first minutiae file of biometric data according to a corresponding location of the first plurality of minutiae points on the first fingerprint image; generating a first pair table from the first minutiae file; storing the first minutiae file with existing minutiae files in a pair table database, dividing the first pair table into a first plurality of subsets; encrypting, via processing circuitry each of the first plurality of subsets; and allocating, via the processing circuitry each of the first plurality of encrypted subsets over a corresponding plurality of data clouds.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1B:
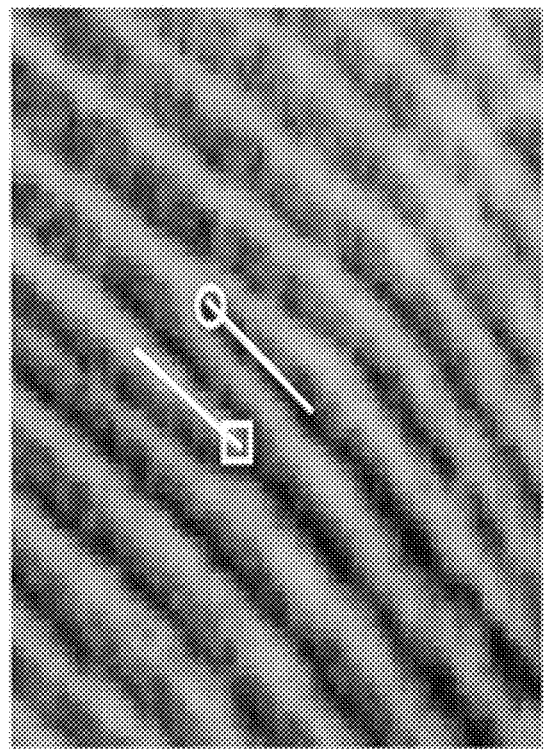
FIG. 1B illustrates a ridge ending indicated by a square and a bifurcation indicated by a circle according to one embodiment.
Figure 1A:
FIG. 1A illustrates a minutiae point indicates both the ridge bifurcation and ridge ending according to one embodiment.
Figure 2:
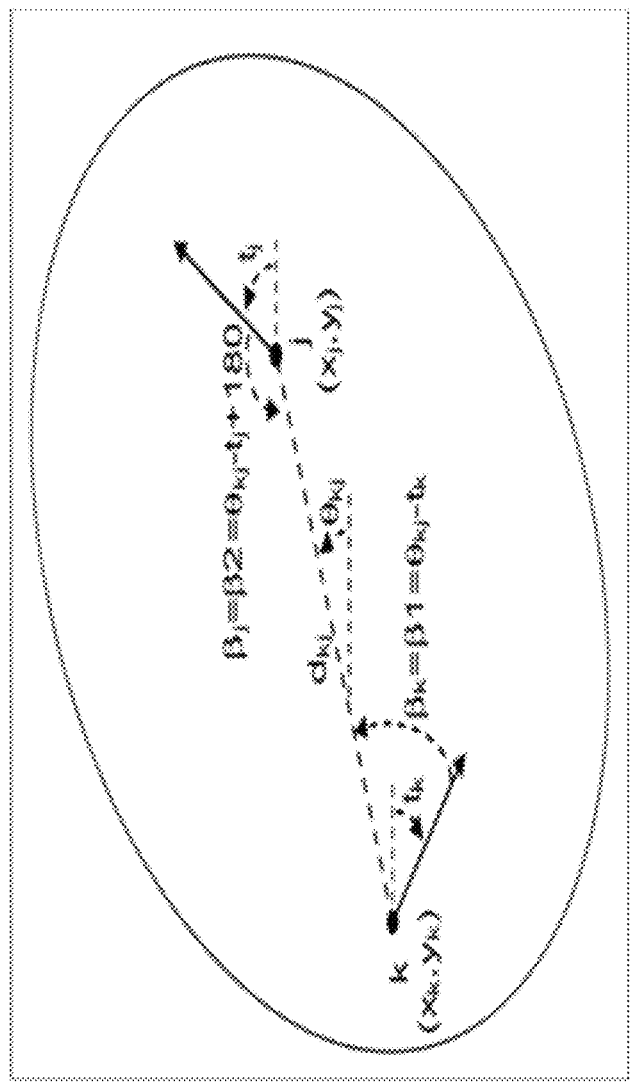
FIG. 2 illustrates values of (dkj, β1, β2, k, j, θkj) from minutiae files according to one embodiment.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

It will be appreciated that in the development of any such actual implementation, numerous implementation-specific decisions may need to be made in order to achieve the developer's specific goals, such as compliance with application- and business-related constraints, and that these specific goals will vary from one implementation to another and from one developer to another.

An objective of the embodiments described herein is the handling of privacy and security issues of biometrics data (i.e. fingerprints) in a cloud environment. A Secured-Bio-Cloud algorithm as described herein achieves a high level of security by dividing the fingerprint features (i.e. minutiae pair table) into smaller subsets. Each subset is encrypted and spread over multiple clouds at the same time. During a fingerprint matching process, the Secured-BioCloud algorithm matches the fingerprints in their secure encoded form without decoding the data, which preserves their privacy. The Secured-BioCloud algorithm achieves an acceptable level of performance compared to conventional methods.

Embodiments described herein include inputting a fingerprint file, generating image maps, binarizing the image, detecting minutiae points by ridge bifurcation and/or ridge endings, removing false minutiae, counting neighboring ridges, accessing minutiae quality, and outputting a minutiae file. The minutiae file has all the minutiae points from a fingerprint image. Each minutiae point on the fingerprint image includes the location, orientation angle, and the quality.

Minutiae files are generated from minutiae points after taking a gallery fingerprint image from a sensor. A pair table is generated, which can be based on algorithms of NIST Bozorth and Forest-Finger. See C. I. Watson et al.; and AZ. Bendale, each incorporated herein by reference in their entirety.

Cloud computing is an information technology paradigm that enables access to shared pools of configurable system resources and higher-level services to achieve coherence and economy of scale, such as a utility. One type of cloud computing is public, which refers to a computing service model used for cloud storage and computation services to the general public. A second type of cloud computing is private, which is operated solely for a single organization. Cloud computing enables organizations to focus on their core businesses instead of expending resources on computer infrastructure and maintenance.

One exemplary model of cloud computing is Infrastructure as a Service (IaaS), which refers to online services that provide high-level Application Programming Interfaces (APIs) used to dereference various low-level details of underlying network infrastructure. Examples include physical computing resources, location, data partitioning, scaling, security, and backup.

A second exemplary model of cloud computing is Platform as a Service (PaaS), which provides the capability to deploy consumer-created or acquired applications onto the cloud infrastructure. A PaaS is created using programming languages, libraries, services, and tools supported by a provider.

A third exemplary model of cloud computing is Software as a Service (SaaS), which uses a provider's applications running on a cloud infrastructure to a consumer. The applications are accessible from various client devices through a client interface, such as a web browser or a program interface.

A fourth exemplary model of cloud computing is Mobile Backend as a Service (MBaaS). Web app and mobile app developers are provided with a way to link their applications to cloud storage and cloud computing services with APIs exposed to their applications and custom software development kits.

An algorithm, such as the Cloud-ID-Screen algorithm divides the gallery pair table into smaller subsets based on distance. See F. J. Alsolami, incorporated herein by reference in its entirety. All of the subsets of the pair table are encrypted before uploading them to the cloud using a revocable fingerprint biotoken, such as Biotope to apply the transform to the data. Unlike passwords, if a biometric database is ever compromised or improperly shared, the underlying biometric data cannot be changed. Revocable or cancelable biometric-based identity tokens (biotokens), if properly implemented, can provide significant enhancements in both privacy and security. See T. E. Boulet et al., incorporated herein by reference in its entirety. Embodiments include two phases of an enrollment phase and a matching phase.

A number of bytes of control fields, such as three are provided for a given row in each subset of the pair table which do not need to be encoded (k, j, θkj). Additional fields have a number of bytes for each (dkj, β1, β2), which need to be encoded and protected as described herein. In one example, three bytes can be used for additional fields.

To provide a first layer of protection, each of the three values to be protected is transformed, via the equation: $v'=(v-t)*s$, where v is the biometric input (dkj, β1, β2), s is the scaling, and t is the translation. The choice of transform parameters depends on the biometric data of the user. After the transform, the data v' is separated into two parts: quotient qd, qb1, qb2 (the stable integer part of v') and the residual rd, rb1, rb2 (fraction part of v').

All of the three quotients are combined into a single four-byte integer, and the three residuals are combined into a single four-byte integer. The quotient portion determines a window for the robust computation, which supports the original positional data that needs to be matched in the matching process. Hence, the q value needs to be encoded to hide the original positional information to provide strong security. While in the residual portion, which is not encoded, the value needs to be within the window in which a local distance can be computed.

To protect the biometric data even if the transform parameters are disclosed, the quotient value needs to be guaranteed as cryptographically secure. Hence, the quotient value is first XORed with the user passcode (which is not stored in the database). The result is encrypted using a user public key to produce an encrypted value (w).

The encrypted value (w), the corresponding r, and their minutiae indices are stored in each row of the pair table. All of the subsets of the pair tables are spread over multiple clouds, wherein only one subset of the pair table is stored in each cloud. The following data is also stored in each cloud: the corresponding subset of the pair table, the transform parameters, and the ID and PK of the user.

Figure 3:
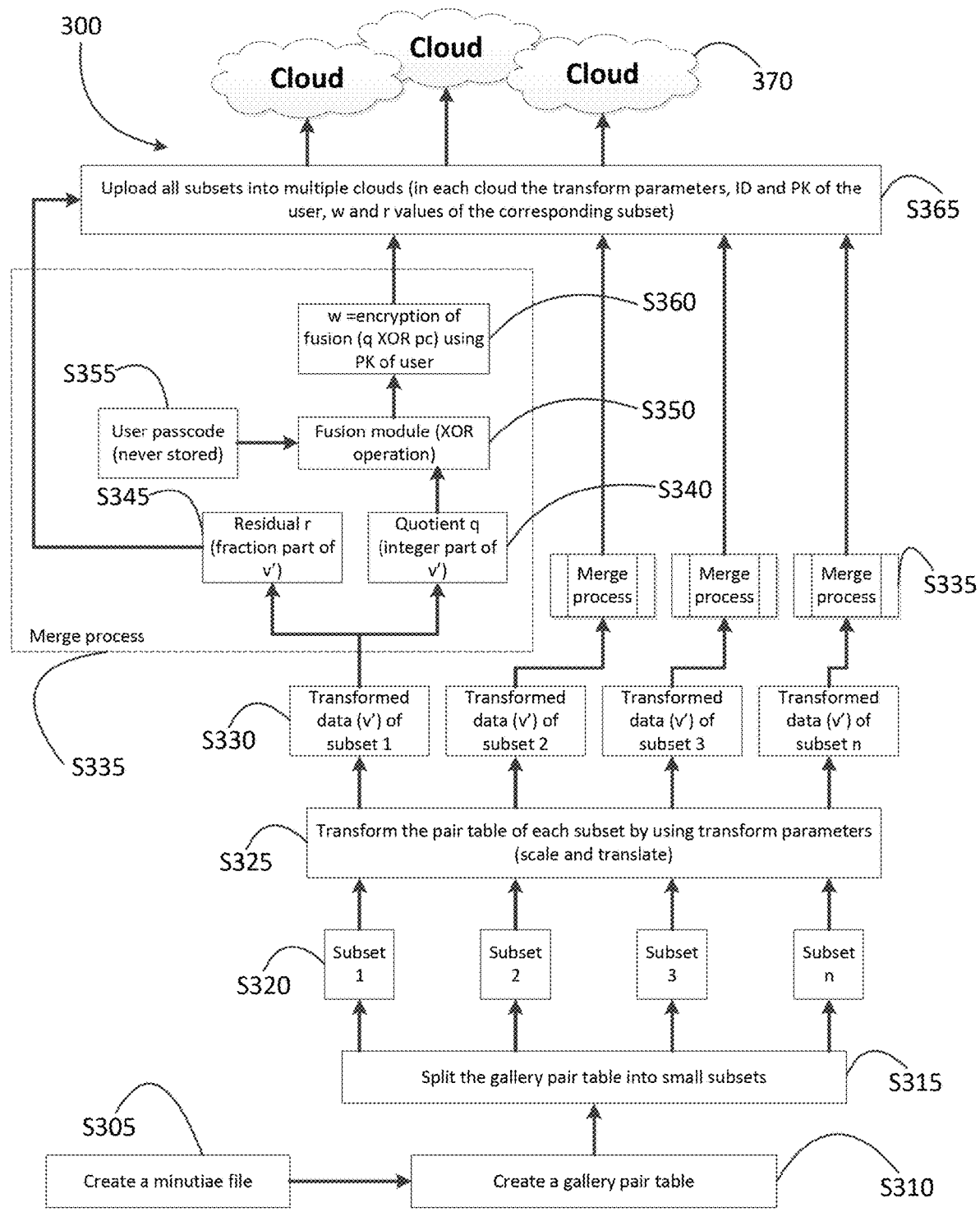
FIG. 3 is a flowchart illustrating an enrollment phase of a Secured-BioCloud algorithm according to one embodiment.

FIG. 3 is a flowchart illustrating the enrollment phase 300 of the Secured-BioCloud algorithm according to embodiments described herein. In step S305, a minutiae file is created. Minutiae files are generated from minutiae points after taking a gallery fingerprint image from a sensor. In step S310, a gallery pair table is created. In one example, the gallery pair table can be based on algorithms of NIST Bozorth and Forest-Finger.

In step S315, the gallery pair table is split into small subsets. The gallery pair table can be divided into smaller subsets based on distance. In step S320, $subset_1$ through $subset_n$ is created.

In step S325, each subset of the pair table is transformed using transform parameters of scale and translate. There are three bytes of control fields for a given row in each of $subset_1$ through $subset_n$ of the pair table which do not need to be encoded (k, j, θkj), and another three fields (dkj, β1, β2) which do need to be encoded and protected. Each of the three values to be protected is transformed, via the equation: $v'=(v-t)*s$, where v is the biometric input (dkj, β1, β2), s is the scaling, and t is the translation. In step S330, data is transformed as v' for each of $subset_1$ through $subset_n$.

In step S335, a merge process for each transformed set of data begins for each of $subset_1$ through $subset_n$. After the data is transformed, the data v' is separated into a quotient part qd, qb1, qb2 (the stable integer part of v') in step S340 and a residual part rd, rb1, rb2 (fraction part of v') in step S345 for each of $subset_1$ through $subset_n$.

In step S350, the quotient value is XORed in a fusion module. In step S355, the user passcode is retrieved and used with the quotient value in step S350. In step S360, the result is encrypted using a user public key (PK) to produce an encrypted value (w).

All of the subsets of the pair table are encrypted before uploading them to the clouds using a revocable fingerprint biotoken to apply the transform to the data. In step S365, the encrypted value (w) from step S360 and the residual r from step S345 are uploaded for all subsets into multiple clouds 370. In each cloud 370, the transform parameters, ID and PK of the user, and the w and r values of the corresponding subset are uploaded for each of $subset_1$ through $subset_n$.

In the matching phase, pair tables of the probe fingerprint image are created by following the same procedures as in the enrollment phase. After creating all of the subsets of the pair table for the probe, the subsets of the probe pair tables are compared with the subsets of the gallery pair tables in the cloud storage to construct a matching table. The subset-1 of the probe pair table is compared against all the subset-1 of the gallery pair table in the cloud-1. The subset-2 of the probe pair table is compared against all the subset-2 of the gallery pair table in the cloud-2. The same procedure is used for all remaining clouds.

In order to preserve privacy and protect biometric data from unauthorized matching attempts, matching in the encrypted domain is supported without the need to decrypt the data. In addition, the probe row is considered to match the gallery row if the corresponding encrypted values are identical and the residuals are within the threshold. In addition, the Secured-BioCloud algorithm constructs a matching table for each cloud in parallel using the Hadoop MapReduce, for example. The matching tables of related identities are combined from all clouds.

The Secured-BioCloud algorithm separates each matching table into consistent minutiae pair groups, wherein each probe minutia point has only one corresponding gallery minutia point. In each CMPG table, the Secured-BioCloud algorithm finds all of the pairs that construct a link between rows in order to create trees and build a forest. The Secured-BioCloud algorithm computes the matching score from the forest and returns the maximum score as well as the related ID.

Figure 4A:
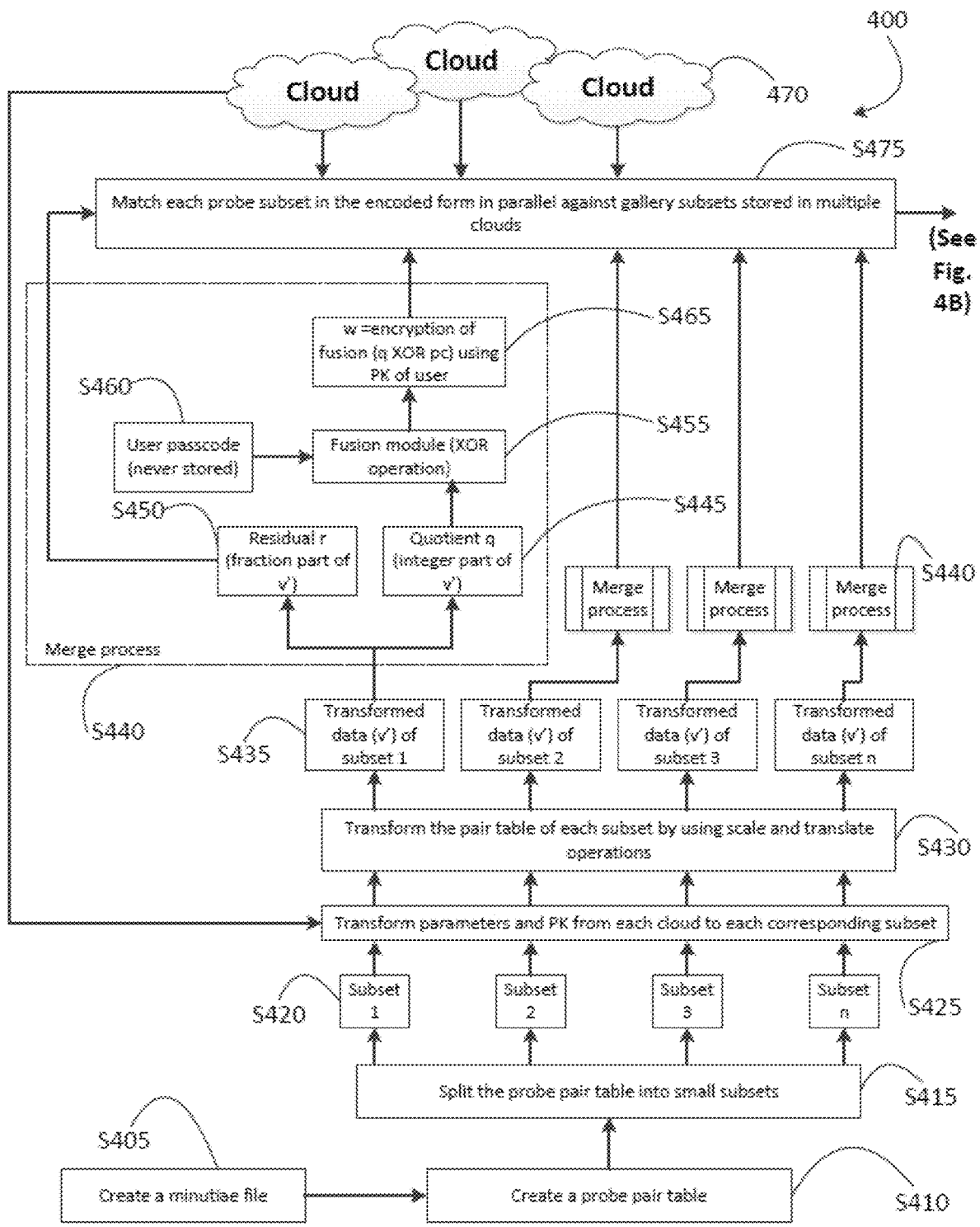
FIGS. 4A and 4B are a flowchart illustrating a matching phase of the Secured-BioCloud algorithm according to one embodiment.
Figure 4B:
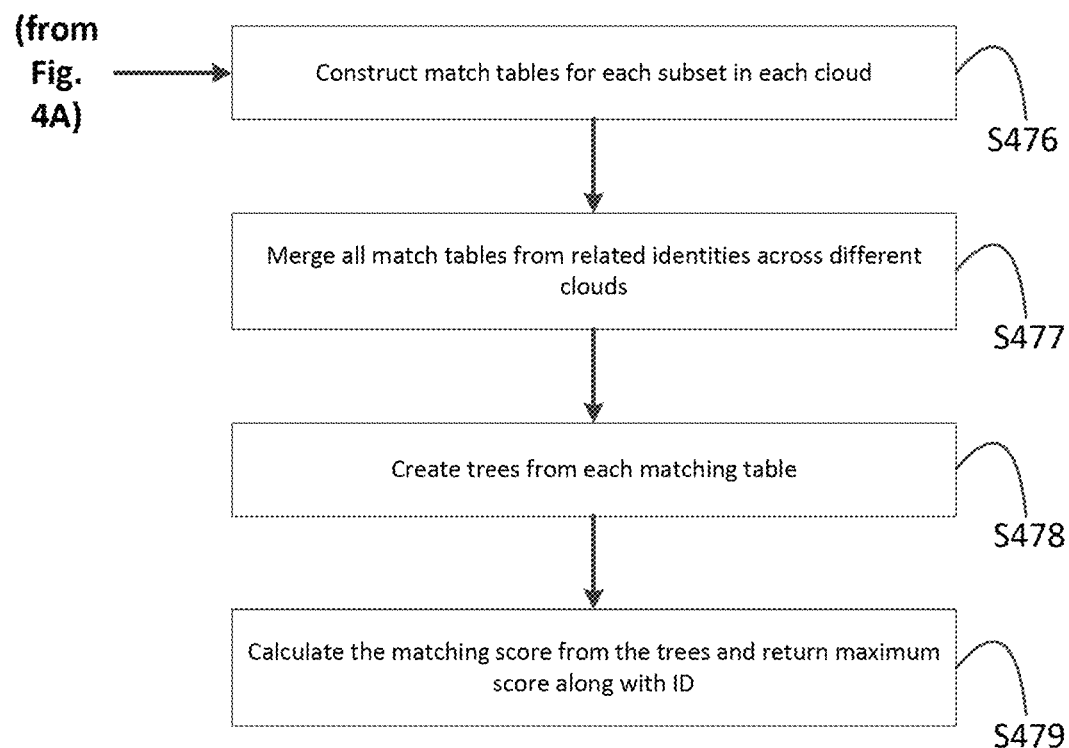

FIGS. 4A and 4B are a flowchart illustrating the matching phase 400 of the Secured-BioCloud algorithm according to embodiments described herein. In step S405, a minutiae file is created. Minutiae files are generated from minutiae points after taking a gallery fingerprint image from a sensor. In step S410, a probe pair table is created.

In step S415, the probe pair table is split into small subsets. The probe pair table can be divided into smaller subsets based on distance. In step S420, $subset_1$ through $subset_n$ is created.

In step S425, the transform parameters and public key (PK) from each cloud 470 is received and matched to each corresponding subset. In step S430, each subset of the pair table is transformed using scale and translate operations. In step S435, data is transformed as v' for each of $subset_1$ through $subset_n$.

In step S440, a merge process for each transformed set of data begins for each of $subset_1$ through $subset_n$. After the data is transformed, the data v' is separated into a quotient part qd, qb1, qb2 (the stable integer part of v') in step S445 and a residual part rd, rb1, rb2 (fraction part of v') in step S450 for each of $subset_1$ through $subset_n$.

In step S455, the quotient value is XORed in a fusion module. In step S460, the user passcode is retrieved and used with the quotient value from step S455. In step S465, the result is encrypted using a user PK to produce an encrypted value (w).

In step S475, each probe subset is matched in the encoded form in parallel against gallery subsets stored in multiple clouds 470. Step S475 is further detailed in FIG. 4B, wherein the match tables for each subset are constructed in each cloud in step S476, all match tables from related identities are merged across different clouds in step S477, trees are created from each matching table in step S478, and the matching score from the trees is calculated and a maximum score is returned along with the ID in step S479.

In the enrollment phase, minutiae files are generated from minutiae points of a gallery fingerprint image. A pair table is generated based on algorithms, such as the NIST Bozorth and the Forest-Finger algorithms. The gallery pair table is divided into smaller subsets based on distance, wherein distances can be different in each subset. The gallery pair table is divided without any overlap between the subsets to maintain security and privacy.

Embodiments described herein divide the pair table data rather than divide the original biometric data. All the subsets of the pair table are encrypted before uploading to one or more cloud systems using a revocable fingerprint biotoken method to apply the transform to each subset data as described herein.

In an example given for illustrative purposes only, the pair tables can be split into one of three different subset-splitting sizes of eight subsets, sixteen subsets, and thirty two subsets based on distance. A pair table includes the relative distance between two minutiae points and three relative angles. Data can be stored in the pair table based on the relative distance ordered from the smallest to the largest distance. Table 1 illustrates a pair table split into small pair tables based on the distance for each mode.

TABLE 1

Pair Table

| Cloud-Id-Screen mode | Subsets | Distances | Clouds^/Machines |
|---|---|---|---|
| 8 Subsets | Subset-1 | 0-2000 | Cloud-1/Machine-1 |
| | Subset-2 | 2000-4000 | Cloud-2/Machine-1 |
| | Subset-8 | Greater than 14000 | Cloud-8/Machine-1 |
| 16 Subsets | Subset-1 | 0-800 | Cloud-1/Machine-1 |
| | Subset-2 | 800-1600 | Cloud-1/Machine-2 |
| | Subset-16 | Greater than 12000 | Cloud-8/Machine-2 |
| 32 Subsets | Subset-1 | 0-400 | Cloud-1/Machine-1 |
| | Subset-2 | 400-800 | Cloud-1/Machine-2 |
| | Subset-32 | Greater than 12400 | Cloud-8/Machine-4 |

As illustrated in Table 1, subset-1 stores the small distance of the pair table while subset-8 stores the largest distance of the pair table for 8 subsets. Similarly, subset-1 stores the small distance of the pair table while subset-16 stores the largest distance of the pair table for 16 subsets, and subset-1 stores the small distance of the pair table while subset-32 stores the largest distance of the pair table for 32 subsets.

A first layer of protection is provided by transforming each biometric feature data using the equation $v'=(v-t)*s$, wherein v is the biometric input, s is the scaling and t is a translation (e.g. random number). The range of values used to determine the scale should be larger than the actual variations of biometric data for the particular user and not just over the enrollment data. This ensures the actual user's data is unlikely to fall outside the scaled window.

The data for v' is separated into two parts of a quotient (q) and a residual (r). Even if the transform parameters are disclosed, the quotient value is cryptographically secure. The quotient value is first XORed with the user passcode, which is never stored in a database. The result is encrypted using the user public key (PK) to produce an encrypted value (w). Each row of the pair table includes data for the encrypted value (w) and the corresponding residual (r).

All subsets of the pair tables are spread over multiple clouds. In each cloud, only one subset of the pair table is stored. In each cloud, data is stored for the corresponding subset of the pair table, the transform parameters, and the ID and PK of the user to be used for verification purposes later.

In the matching phase, pair tables of a probe fingerprint image are created using a similar procedure as in the enrollment phase. After creating the encrypted subsets of the probe pair table, the encrypted subsets of the probe pair tables are compared with the encrypted subsets of the gallery pair tables in cloud storage to construct the matching table. For example, subset-1 of the probe pair table is compared against all of the subsets-1 of the gallery pair table in cloud-1. All remaining clouds follow the same matching procedure. The privacy of biometric data is protected from unauthorized matching attempts because the matching occurs without decrypting the data.

A probe row is considered to match a gallery row when the corresponding encrypted values are identical and the residuals are within a predetermined threshold. A match table is also constructed for each cloud in parallel. The match tables of related identities are combined from all clouds. Subsequently, each match table is separated into Consistent Minutiae Pair Groups (CMPG), wherein each probe minutiae point has only one corresponding gallery minutiae point. In each CMPG table, all pairs are located that construct a link between rows in order to create trees and build a forest.

Embodiments described herein create forests of trees from edges of minutiae pairs to form consistent connected components in each forest. The size of the consistent connected components determines the match score. A match score is a total number of edge-pair entries that form connected components, i.e. forests of trees. After computing the match score from the forest, a maximum score is returned along with the related ID.

Figure 5:
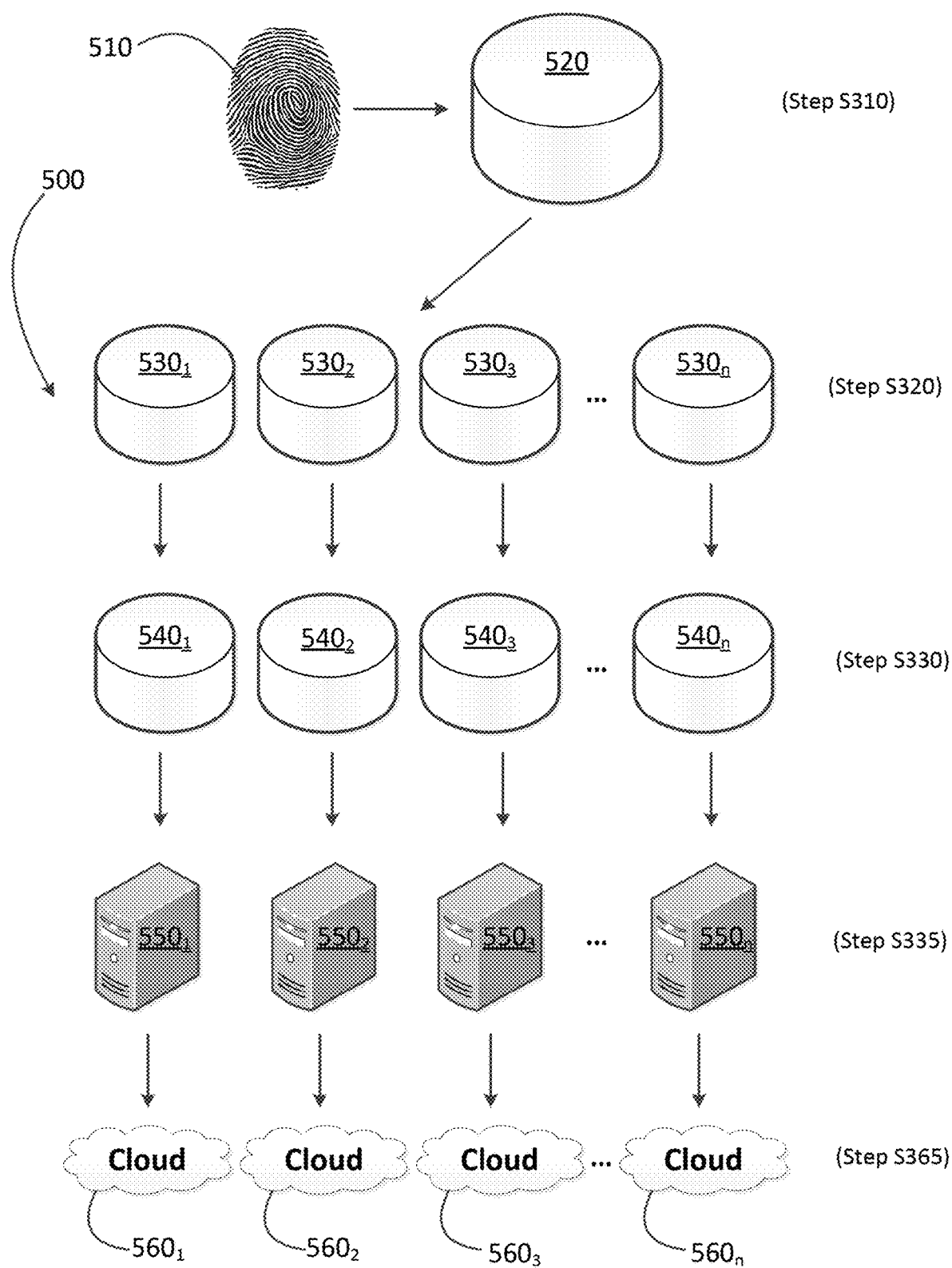
FIG. 5 is a schematic of an enrollment phase of a fingerprint matching system according to one embodiment.

FIG. 5 is a schematic of an enrollment phase of a fingerprint matching system 500 by which the enrollment phase algorithm 300 is executed. Minutiae points are obtained from a gallery fingerprint image 510 taken from a sensor. A gallery pair table database 520 includes generated pairs based on algorithms, such as NIST Bozorth and Forest-Finger. Formation of the gallery pair table database 520 corresponds to step S310 of FIG. 3.

The gallery pair table database 520 is split into multiple subsets to form gallery pair table subset databases $530_1$, $530_2$, $530_3$, through $530_n$. Formation of the gallery pair table subset databases $530_1$, $530_2$, $530_3$, through $530_1$ corresponds to step S320 of FIG. 3. FIG. 5 illustrates separate databases for each of the gallery pair table subset databases $530_1$, $530_2$, $530_3$, through $530_n$. However, the gallery pair table subset databases $530_1$, $530_2$, $530_3$, through $530_n$ could also be one or two physically distinct databases.

Each of the gallery pair table subset databases $530_1$, $530_2$, $530_3$, through $530_n$ are transformed according to $v'=(v-t)*s$, where v is the biometric input (dkj, β1, β2), s is the scaling, and t is the translation to form corresponding transformed subset databases $540_1$, $540_2$, $540_3$, through $540_n$. Formation of the transformed subset databases $540_1$, $540_2$, $540_3$, through $540_n$ corresponds to step S330 of FIG. 3. FIG. 5 illustrates separate databases for each of the transformed subset databases $540_1$, $540_2$, $540_3$, through $540_n$. However, the transformed subset databases $540_1$, $540_2$, $540_3$, through $540_n$ could also be one or two physically distinct databases.

Each of the transformed subset databases $540_1$, $540_2$, $540_3$, through $540_n$ are processed by a corresponding processor $550_1$, $550_2$, $550_3$, through $550_n$ in a merge process. Each merged process corresponds to step S335 in FIG. 3. FIG. 5 illustrates separate processors for each of the merged processes. However, the processors $550_1$, $550_2$, $550_3$, through $550_n$ could also be one or two physically distinct processors.

The encrypted value (w) and the residual r are uploaded for subsets from each merged process into respective multiple clouds $560_1$, $560_2$, $560_3$, through $560_n$. The transform parameters, ID and PK of the user, and the w and r values of the corresponding subset are uploaded for each of $subset_1$ through $subset_n$. Each uploaded subset corresponds to step S365 in FIG. 3.

Figure 6:
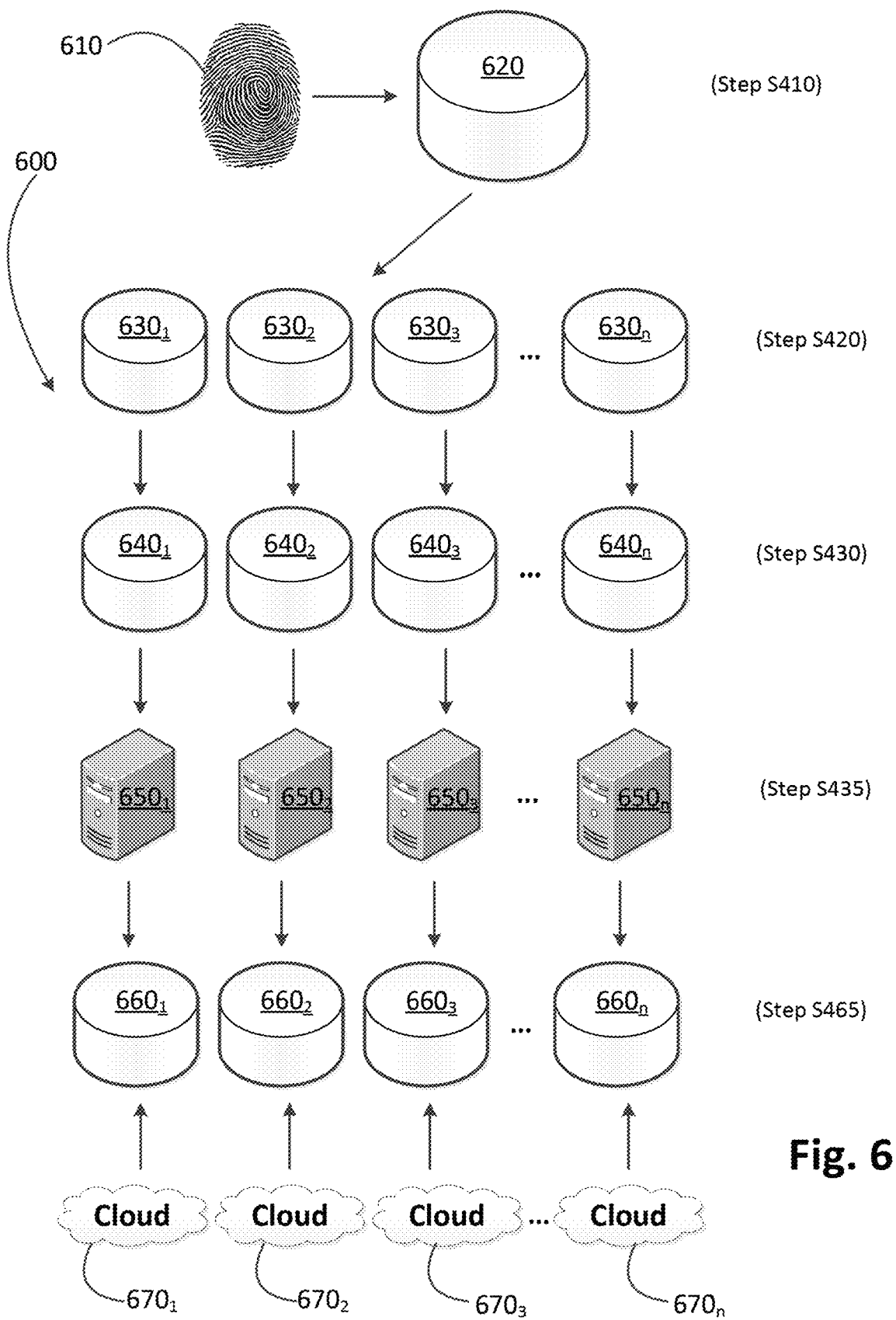
FIG. 6 is a schematic of a matching phase of a fingerprint matching system according to one embodiment.

FIG. 6 is a schematic of a matching phase of a fingerprint matching system 600 by which the matching phase algorithm 400 is executed. Minutiae points are obtained from a probe fingerprint image 610 taken from a sensor. A probe pair table database 620 includes generated probe pairs. Formation of the probe pair table database 620 corresponds to step S410 of FIG. 4A.

The probe pair table database 620 is split into multiple subsets to form probe pair table subset databases $630_1$, $630_2$, $630_3$, through $630_n$. Formation of the probe pair table subset databases $630_1$, $630_2$, $630_3$, through $630_n$ corresponds to step S420 of FIG. 4A. FIG. 6 illustrates separate databases for each of the probe pair table subset databases $630_1$, $630_2$, $630_3$, through $630_n$. However, the probe pair table subset databases $630_1$, $630_2$, $630_3$, through $630_n$ could also be one or two physically distinct databases.

Each of the probe pair table subset databases $630_1$, $630_2$, $630_3$, through $630_n$ are transformed according to v'=(v−t)*s, where v is the biometric input (dkj, β1, β2), s is the scaling, and t is the translation to form corresponding transformed subset databases $640_1$, $640_2$, $640_3$, through $640_n$. Formation of the transformed subset databases $640_1$, $640_2$, $640_3$, through $640_n$ corresponds to step S430 of FIG. 4A. FIG. 6 illustrates separate databases for each of the transformed subset databases $640_1$, $640_2$, $640_3$, through $640_n$. However, the transformed subset databases $640_1$, $640_2$, $640_3$, through $640_n$ could also be one or two physically distinct databases.

Each of the transformed subset databases $640_1$, $640_2$, $640_3$, through $640_n$ are processed by a corresponding processor $650_1$, $650_2$, $650_3$, through $650_n$ in a merge process. Each merged process corresponds to step S435 in FIG. 4A. FIG. 6 illustrates separate processors for each of the merged processes. However, the processors $650_1$, $650_2$, $650_3$, through $650_n$ could also be one or two physically distinct processors.

Each probe subset is matched in its encoded form against a gallery subset in respective matched subset databases $660_1$, $660_2$, $660_3$, through $660_n$. The gallery subsets are stored in multiple clouds $670_1$, $670_2$, $670_3$, through $670_n$. The respective matching corresponds to step S465 in FIG. 4A. FIG. 6 illustrates separate databases for each of the matched subset databases $660_1$, $660_2$, $660_3$, through $660_n$. However, the matched subset databases $660_1$, $660_2$, $660_3$, through $660_n$ could also be one or two physically distinct databases.

Figure 7:
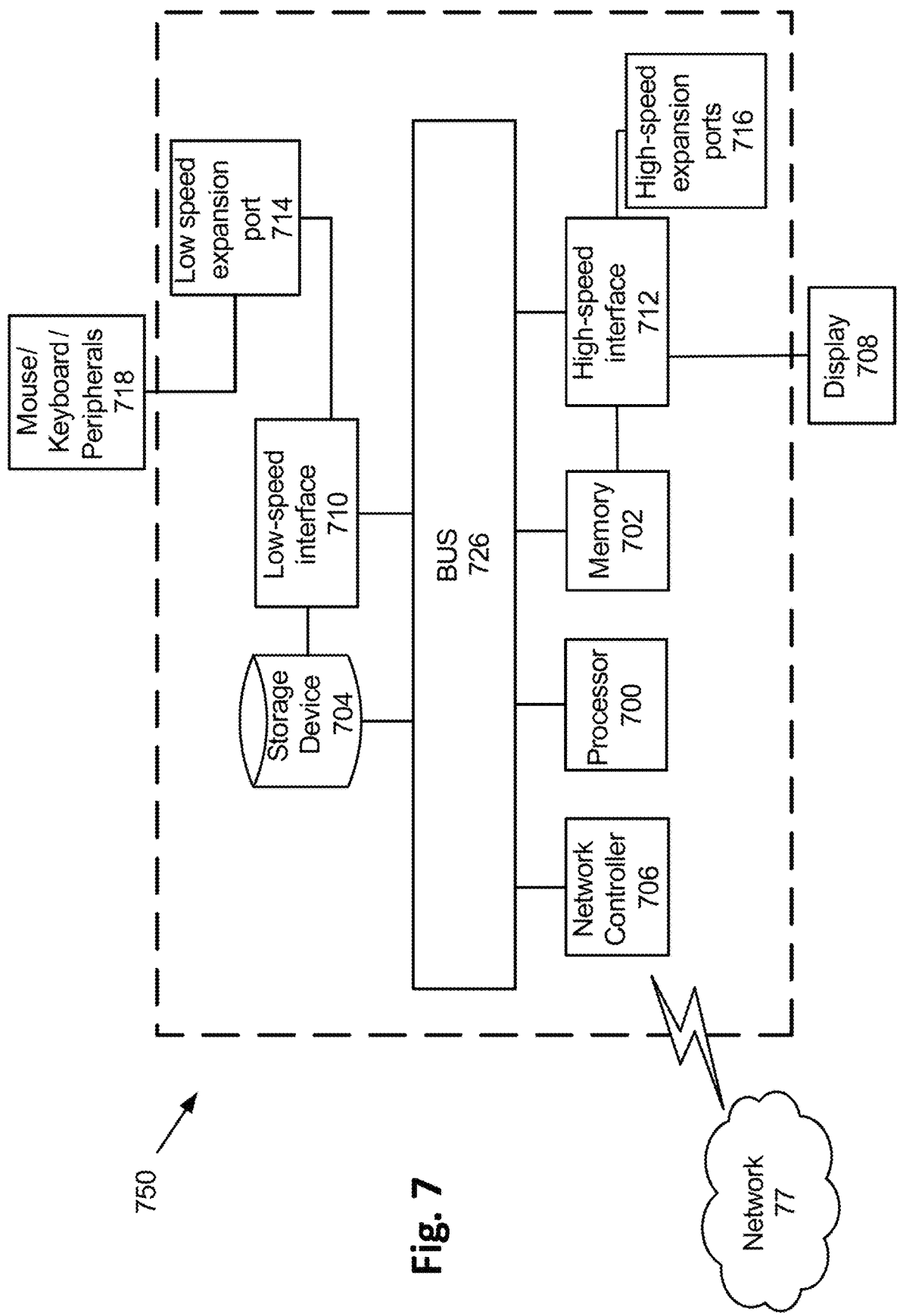
FIG. 7 is a schematic of an exemplary computing device according to one embodiment.

FIG. 7 is a schematic of an exemplary computing device 750, such as the processors $550_1$, $550_2$, $550_3$, through $550n$ or $650_1$, $650_2$, $650_3$, through $650_n$, or any of the databases 520, $530_1$, $530_2$, $530_3$, through $530_1$, $540_1$, $540_2$, $540_3$, through $540_1$, 620, $630_1$, $630_2$, $630_3$, through $630_n$, $640_1$, $640_2$, $640_3$, through $640_n$ or $660_1$, $660_2$, $660_3$, through $660_n$, all of which can be used to implement the techniques described in this disclosure. The computing device 750 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

The computing device 750 includes a processor 700, a memory 702, a storage device 704, a high-speed interface 712 connecting to the memory 702 and multiple high-speed expansion ports 716, and a low-speed interface 710 connecting to a low-speed expansion port 714 and the storage device 704. Each of the processor 700, the memory 702, the storage device 704, the high-speed interface 712, the high-speed expansion ports 716, and the low-speed interface 710 are interconnected using various busses, such as communication bus 726, and may be mounted on a common motherboard or in other manners as appropriate.

The processor 700 can process instructions for execution within the computing device 750, including instructions stored in the memory 702 or on the storage device 704 to display graphical information for a GUI on an external input/output device, such as a display 708 coupled to the high-speed interface 712. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 702 stores information within the computing device 750. In some implementations, the memory 702 is a volatile memory unit or units. In some implementations, the memory 702 is a non-volatile memory unit or units. The memory 702 can also be another form of computer-readable medium, such as a magnetic or optical disk.

The storage device 704 is capable of providing mass storage for the computing device 750. In some implementations, the storage device 704 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 700), perform one or more methods, such as those described above. The instructions can also be stored by one or more storage devices, such as computer- or machine-readable mediums (for example, the memory 702, the storage device 704, or memory on the processor 700).

The high-speed interface 712 manages bandwidth-intensive operations for the computing device 750, while the low-speed interface 710 manages lower bandwidth-intensive operations. Such allocation of functions is an example only. In some implementations, the high-speed interface 712 is coupled to the memory 702, the display 708 (e.g., through a graphics processor or accelerator), and to the high-speed expansion ports 716, which may accept various expansion cards (not shown). In the implementation, the low-speed interface 710 is coupled to the storage device 704 and the low-speed expansion port 714. The low-speed expansion port 714, which can include various communication ports (e.g., USB, Bluetooth, Ethernet, wireless Ethernet) can be coupled to one or more input/output devices 718, such as a keyboard, a pointing device, a scanner, or a networking device such as a switch or router, e.g., through a network adapter.

The computing device 750 also includes a network controller 706, such as an Intel Ethernet PRO network interface card from Intel Corporation of America, for interfacing with a network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the computing device of FIG. 7 is described as having a storage medium device 704, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 708 (e.g., a CRT (cathode ray tube) or LCD (liquid crystal display) monitor) for displaying information to the user and a keyboard and a pointing device 718 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

Figure 8:
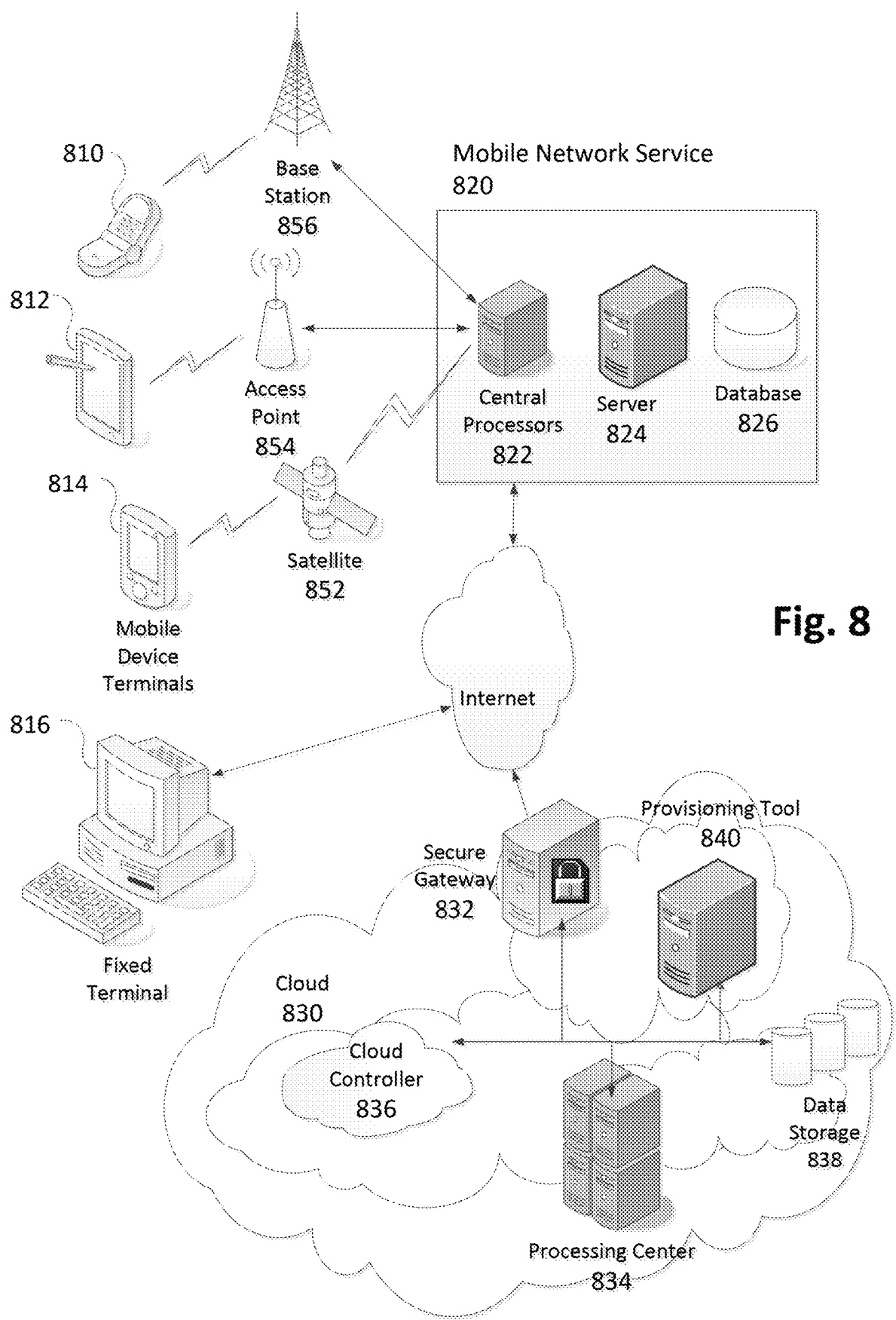
FIG. 8 is a schematic of an exemplary cloud computing system according to one embodiment.

FIG. 8 is a schematic of an exemplary cloud computing system, wherein users access the cloud through mobile device terminals or fixed terminals that are connected to the Internet or other network. One or more of the clouds 370, 470, $560_1$, $560_2$, $560_3$, through $560_n$, or the clouds $670_1$, $670_2$, $670_3$, through $670_n$ could be used in the cloud computing system illustrated in FIG. 8.

The mobile device terminals can include a cell phone 810, a tablet computer 812, and a smartphone 814, for example. The mobile device terminals can connect to a mobile network service 820 through a wireless channel such as a base station 856 (e.g., an Edge, 3G, 4G, or LTE Network), an access point 854 (e.g., a femto cell or WiFi network), or a satellite connection 852. In one implementation, signals from the wireless interface to the mobile device terminals (e.g., the base station 856, the access point 854, and the satellite connection 852) are transmitted to a mobile network service 820, such as an EnodeB and radio network controller, UMTS, or HSDPA/HSUPA. Mobile users' requests and information are transmitted to central processors 822 that are connected to servers 824 to provide mobile network services, for example. Further, mobile network operators can provide service to mobile users for authentication, authorization, and accounting based on home agent and subscribers' data stored in databases 826, for example. The subscribers' requests are subsequently delivered to a cloud 830 through the Internet.

A user can also access the cloud 830 through a fixed terminal 816, such as a desktop or laptop computer or workstation that is connected to the Internet via a wired network connection or a wireless network connection. The mobile network service 820 can be a public or a private network such as an LAN or WAN network. The mobile network service 820 can be wireless such as a cellular network including EDGE, 3G and 4G wireless cellular systems. The wireless mobile network service 820 can also be Wi-Fi, Bluetooth, or any other wireless form of communication that is known.

The user's terminal, such as a mobile user terminal and a fixed user terminal, provides a mechanism to connect via the Internet to the cloud 830 and to receive output from the cloud 830, which is communicated and displayed at the user's terminal. In the cloud 830, a cloud controller 836 processes the request to provide users with the corresponding cloud services. These services are provided using the concepts of utility computing, virtualization, and service-oriented architecture.

In one implementation, the cloud 830 is accessed via a user interface such as a secure gateway 832. The secure gateway 832 can for example, provide security policy enforcement points placed between cloud service consumers and cloud service providers to interject enterprise security policies as the cloud-based resources are accessed. Further, the secure gateway 832 can consolidate multiple types of security policy enforcement, including for example, authentication, single sign-on, authorization, security token mapping, encryption, tokenization, logging, alerting, and API control. The cloud 830 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 840 that prepares and equips the cloud resources, such as the processing center 834 and data storage 838 to provide services to the users of the cloud 830. The processing center 834 can be a computer cluster, a data center, a main frame computer, or a server farm. In one implementation, the processing center 834 and data storage 838 are collocated.

Embodiments described herein can be implemented in conjunction with one or more of the devices described above with reference to FIGS. 7-8. Embodiments described herein are a combination of hardware and software, and processing circuitry by which the software is implemented.

Several advantages are realized by using systems and methods described herein. In the enrollment phase, minutiae files are generated from minutiae points of a gallery fingerprint image. A pair table is generated based on algorithms, such as the NIST Bozorth and the Forest-Finger algorithms. The gallery pair table is divided into smaller subsets based on distance, wherein the distances can be different in each subset. The gallery pair table is divided without any overlap between the subsets to maintain security and privacy.

Embodiments described herein divide the pair table data rather than divide the original biometric data. All the subsets of the pair table are encrypted before uploading to one or more cloud systems using a revocable fingerprint biotoken method to apply the transform to each subset data as described herein.

All subsets of the pair tables are spread over multiple clouds. In each cloud, only one subset of the pair table is stored. In each cloud, data is stored for the corresponding subset of the pair table, the transform parameters, and the ID and PK of the user to be used for verification purposes later.

In the matching phase, pair tables of a probe fingerprint image are created using a similar procedure as in the enrollment phase. After creating the encrypted subsets of the probe pair table, the encrypted subsets of the probe pair tables are compared with the encrypted subsets of the gallery pair tables in cloud storage to construct the matching table. For example, subset-1 of the probe pair table is compared against all of the subsets-1 of the gallery pair table in cloud-1. All remaining clouds follow the same matching procedure. The privacy of biometric data is protected from unauthorized matching attempts because the matching occurs without decrypting the data.

Embodiments described herein include the following aspects.

(1) A method of characterizing a fingerprint includes extracting a first plurality of minutiae points from a first fingerprint image, via a fingerprint image sensor; generating a first minutiae file of biometric data according to a corresponding location of the first plurality of minutiae points on the first fingerprint image; generating a first pair table from the first minutiae file; storing the first minutiae file with existing minutiae files in a pair table database; dividing the first pair table into a first plurality of subsets; encrypting, via processing circuitry each of the first plurality of subsets; and allocating, via the processing circuitry each of the first plurality of encrypted subsets over a corresponding plurality of data clouds.

(2) The method of (1), wherein each of the first plurality of subsets includes one or more transform parameters, an identification, a public key of a user, and an encrypted value of each subset.

(3) The method of either one of (1) or (2), further includes receiving a second fingerprint image at a fingerprint module; extracting a second plurality of minutiae points from the second fingerprint image; generating a second minutiae file of biometric data according to a corresponding location of the second plurality of minutiae points on the second fingerprint image; generating a second pair table from the second minutiae file; dividing the second pair table into a second plurality of subsets; encrypting, via processing circuitry each of the second plurality of subsets; and comparing, via the processing circuitry each of the encrypted second plurality of subsets against one or more existing encrypted subsets stored in the plurality of data clouds.

(4) The method of any one of (1) through (3), further includes generating, via the processing circuitry a match table for each of the encrypted second plurality of subsets and a corresponding compatible existing encrypted subset stored in the plurality of data clouds.

(5) The method of any one of (1) through (4), further includes merging all of the matched tables from related identities across the plurality of data clouds; creating a tree from each matching pair table; calculating a matching score from all of the created trees; and returning a maximum score with its corresponding identification.

(6) The method of any one of (1) through (5), wherein the first pair table and the second pair table include a distance between and an orientation angle of each pair of respective first minutiae points and second minutiae points.

(7) The method of any one of (1) through (6), wherein each of the first plurality of subsets is encrypted via a revocable fingerprint biotoken.

(8) The method of any one of (1) through (7), further includes separating each subset of transformed biometric data into a plurality of quotients and a plurality of residuals; combining the plurality of quotients into a quotient integer; encoding the quotient integer, and combining the plurality of residuals into a residual integer.

(9) The method of any one of (1) through (8), wherein the allocating further includes uploading each of the plurality of residual integers into a corresponding plurality of data clouds; and uploading each of the encoded quotient integers into the corresponding plurality of data clouds.

(10) A method of characterizing a fingerprint includes receiving a fingerprint image at a fingerprint module; extracting a plurality of minutiae points from the fingerprint image, via a fingerprint image sensor; generating a minutiae file of biometric data according to a corresponding location of the plurality of minutiae points on the fingerprint image;

generating a pair table from the minutiae file; dividing the pair table into a plurality of subsets; encrypting, via processing circuitry each of the plurality of subsets; comparing, via the processing circuitry each of the encrypted plurality of subsets against one or more existing encrypted subsets stored across a plurality of data clouds; and generating, via the processing circuitry a match table for each of the encrypted plurality of subsets and a corresponding compatible existing encrypted subset stored in the plurality of data clouds.

(11) The method of (10), further includes merging all of the matched tables from related identities across the plurality of data clouds; creating a tree from each matching pair table; calculating a matching score from all of the created trees; and returning a maximum score with its corresponding identification.

(12) The method of either one of (10) or (11), further includes separating each subset of transformed biometric data into a plurality of quotients and a plurality of residuals; combining the plurality of quotients into a quotient integer, encoding the quotient integer, and combining the plurality of residuals into a residual integer.

(13) The method of any one of (10) through (12), wherein the pair table includes a distance between and an orientation angle of each pair of minutiae points.

(14) A fingerprint matching system includes processing circuitry configured to receive a fingerprint image at a fingerprint module; extract a plurality of minutiae points from the fingerprint image, via a fingerprint image sensor; generate a minutiae file of biometric data according to a corresponding location of the plurality of minutiae points on the fingerprint image; generate a pair table from the minutiae file; divide the pair table into a plurality of subsets; encrypt each of the plurality of subsets; compare each of the encrypted plurality of subsets against one or more existing encrypted subsets stored across a plurality of data clouds; and generate a match table for each of the encrypted plurality of subsets and a corresponding compatible existing encrypted subset stored in the plurality of data clouds.

(15) The fingerprint matching system of (14), wherein the processing circuitry is further configured to merge all of the matched tables from related identities across the plurality of data clouds; create a tree from each matching pair table; calculate a matching score from all of the created trees; and return a maximum score with its corresponding identification.

(16) The fingerprint matching system of either one of (14) or (15), wherein the processing circuitry is further configured to separate each subset of transformed biometric data into a plurality of quotients and a plurality of residuals; combine the plurality of quotients into a quotient integer; encode the quotient integer, and combine the plurality of residuals into a residual integer.

(17) The fingerprint matching system of any one of (14) through (16), wherein the pair table includes a distance between and an orientation angle of each pair of minutiae points.

Several embodiments and advantages realized therefrom are described herein. In one embodiment, in the enrollment process, one gallery fingerprint image is taken from a sensor. The minutiae files are generated from the token fingerprint image. A pair table is generated and the pair table is divided into smaller subsets based on distance between minutiae points. After dividing the pair table, a revocable fingerprint biotoken, such as Biotope is applied to encrypt all the subsets of the pair table. The subsets of the pair table are encrypted using transform parameters, wherein the choice of transform parameters depends on the biometric data of the user. In contrast, some conventional algorithms transform and encode the data according to a predetermined encoding system.

After the transform, the data is separated into two parts of a quotient (q) and a residual (r). The quotient value is first XORed with a user passcode, which is not stored in a database. The result is encrypted using a user public key to produce an encrypted value (w). The encrypted subsets of the pair tables are allocated over multiple clouds. In each cloud, just one subset of the pair table is stored, wherein only one fingerprint template is saved for each user.

In the matching process, one probe fingerprint image is taken to create and encrypt the subsets using the same procedures as in the enrollment phase. After creating the encrypted subsets of the pair table for the probe, the subsets of the probe pair tables are compared with the subsets of the gallery pair tables in the cloud. The probe row is considered to match the gallery row if the corresponding encrypted values are identical and the residuals are within a threshold. If the two fingerprints match, only the related ID is returned. In some conventional algorithms, several matches between a hash value of an enrollment string and a hash value of a string of symbols are generated for several matches.

In another embodiment, an algorithm, such as MINDTCT takes a fingerprint image to create a minutiae file. The algorithm inputs a fingerprint file, generates image maps, forms a binary image, detects a minutiae point by ridge bifurcation and/or ridge ending, removes false minutiae, counts neighboring ridges, accesses minutiae quality, and outputs the minutiae file. The minutiae file has all the minutiae points from the fingerprint image. Each minutiae point on the fingerprint image has the orientation angle and quality in addition to the location (x coordinate and y coordinate).

In another embodiment, in the enrollment process, a fingerprint image is taken from an image sensor. Minutiae files are generated from minutiae points to generate the pair table based on algorithms of the NIST Bozorth and the Forest-Finger, for example. The gallery pair table is divided into smaller subsets based on a distance between minutiae points using the Cloud-ID-Screen algorithm, for example. All of the subsets of the pair table are encrypted before uploading them to multiple clouds by using revocable fingerprint biotokens, such as the Biotope method to apply the transform to each subset data.

The transform is applied to provide a first layer of protection by transforming each biometric feature data, via $v'=(v-t)*s$, where v is the biometric input, s is the scaling, and t is a translation (random number). The range of values used to determine the scale should be larger than the actual variation of biometric data for that particular user, and not just over the enrollment data. This is implemented to ensure the actual user's data is unlikely to fall outside the scaled window.

After the transform, the data v' is separated into two parts of a quotient (q) and a residual (r). To protect the biometric data, even if the transform parameters are disclosed, the quotient value is cryptographically secured. The quotient value is XORed with a user passcode, which is not stored in a database, and the result is encrypted using a user public key (PK) to produce an encrypted value (w). The encrypted value (w) and the corresponding (r) are stored in each row of the pair table. All subsets of the pair tables are spread over multiple clouds, while in each cloud, only one subset of the pair table is stored. In addition, each cloud stores the corresponding subset of the pair table, the transform parameters, and the ID and PK of the user to be used for verification purposes later. In conclusion, the image is segmented into blocks and the minutiae points of the fingerprint are found, and the Gabor expansion is applied to transform the data. Minutiae points are then extracted to create the pair table. The pair table is split into small subsets, which are encrypted by using a Biotope method, for example.

In the matching process, the pair tables of the probe fingerprint image are created by the same procedure as the enrollment phase. After creating all the encrypted subsets of the pair table for the probe, the encrypted subsets of the probe pair tables are compared with the encrypted subsets of the gallery pair tables in the cloud storage to construct the matching table. Subset-1 of the probe pair table is compared against all the subset-1 of the gallery pair table in cloud-1, and a similar procedure is used for all remaining clouds. In order to preserve the privacy and protect biometric data from unauthorized matching attempts, matching the encrypted domain is supported without the need to decrypt the data. Two encrypted fingerprint templates are compared in a verification procedure.

In another embodiment, the probe row is considered to match the gallery row if the corresponding encrypted values are identical and the residuals are within a threshold. A match table is constructed for each cloud in parallel using the Hadoop MapReduce, for example. The match tables of related identities from all clouds are matched. Afterwards, each matching table is separated into consistent minutiae pair groups, wherein each probe minutiae point has only one corresponding gallery minutiae point. In each matching table, all pairs that construct a link between rows is found to create trees and build a forest. A forest of trees is created from edges of minutiae pairs to form consistent connected components in the forests. The size of the consistent connected components determines the match score. A match score is a total number of edge-pair entries that form connected components (forests of trees). After computing the match score from the forest, a maximum score is returned with the related ID.

In another embodiment, a pair table is created with the minutiae data from a fingerprint image, rather than dividing the fingerprint image into patches. The pair table is divided into small subsets, wherein each subset is encrypted using a Biotope approach for example, to implement matching in the encrypted domain in the cloud. The minutia point is computed in the fingerprint image using a computed orientation angle and quality in addition to its location.

In another embodiment, in the enrollment process, a fingerprint image is taken from an image sensor. The minutiae files are generated from minutiae points to generate the pair table based on algorithms of the NIST Bozorth and the Forest-Finger, for example. The gallery pair table is divided into smaller subsets based on a distance between minutiae points, wherein the distances are different in each subset as in the Cloud-ID-Screen algorithm, for example. The pair table is split without any overlap between subsets to maintain security and privacy. The pair table data is divided, rather than dividing the original biometric data. The data is divided based on the distance without overlapping, in contrast to randomly selecting the regions that intersect with each other. After dividing the pair table, the Biotope is applied to encrypt all the subsets of the pair table prior to uploading to the clouds.

In another embodiment, pair tables are constructed from minutiae point files. The pair table is split into one of three different subset-splitting sizes, for example. In one example, the subset-splitting sizes are eight subsets, sixteen subsets, and thirty-two subsets, which are based on distance between minutiae points. However, other numbers of subsets and sizes of subsets are contemplated by embodiments described herein. The pair table includes the relative distance between two minutiae points and three relative angles, for example. The data is stored in the pair table based on the relative distance, such as the smallest to the largest distance. Table 1 illustrates an exemplary pair table in which the pair table is split into small pair tables based on the distance for each mode.

In another embodiment, the NIST Bozorth algorithm and the Forest-Finger algorithms are used, for example to take the image and extract the minutiae points from a fingerprint image. A sensor takes a fingerprint image and creates a minutiae file. The minutiae file is a list of minutiae points in a fingerprint image with $(x, y, \theta, q)$ entries, where $(x, y)$ is the position of the minutia point in the fingerprint image, $\theta$ is the orientation angle of the ridge at the minutia point, and $q$ is the quality of the minutia point. Other conventional algorithms have just the three coordinates of $x$, $y$, and $\theta$, whereas embodiments described herein also include a quality field. An objective of the quality variable is to choose the minutiae points/pairs with higher quality, which helps to increase the accuracy of the algorithm. After minutiae files are generated from the minutiae points, a pair table is created. The fingerprint image is not split into a square, rectangle, a circle, or any other shape as in conventional algorithms. Instead, pair table data is split rather than splitting the fingerprint image. One of three different subset-splitting sizes is used, such as eight subsets, sixteen subsets, and thirty-two subsets based on distance between minutiae points. However, other numbers of subsets and sizes of subsets are contemplated by embodiments described herein.

In another embodiment, a distance between a minutiae pair is considered, rather than a binary feature of the pair bits. None of the data is deleted. Instead, the data is split into a minutiae pair.

In another embodiment, biometric data is generated from a fingerprint image. The data is divided into smaller subsets, the subsets are encrypted, and the subsets are allocated over multiple data clouds. As a result, there is one enrollment template for each individual. In contrast, conventional algorithms extract feature data from a set of biometric data that corresponds to a biometric sample. The extracted feature data is encoded with a processor to create one or more enrollment templates of encoded features.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A method of characterizing a fingerprint, the method comprising:
   extracting a first plurality of minutiae points from a first fingerprint image, via a fingerprint image sensor;
   generating a first minutiae file of biometric data according to a corresponding location of the first plurality of minutiae points on the first fingerprint image;
   generating a first pair table from the first minutiae file;
   storing the first minutiae file with existing minutiae files in a pair table database;
   dividing the first pair table into a first plurality of subsets;
   encrypting, via processing circuitry each of the first plurality of subsets; and
   allocating, via the processing circuitry each of the first plurality of encrypted subsets over a corresponding plurality of data clouds.

2. The method of claim 1, wherein each of the first plurality of subsets includes one or more transform parameters, an identification, a public key of a user, and an encrypted value of each subset.

3. The method of claim 1, further comprising:
   receiving a second fingerprint image at a fingerprint module;
   extracting a second plurality of minutiae points from the second fingerprint image;
   generating a second minutiae file of biometric data according to a corresponding location of the second plurality of minutiae points on the second fingerprint image;
   generating a second pair table from the second minutiae file;
   dividing the second pair table into a second plurality of subsets;
   encrypting, via processing circuitry each of the second plurality of subsets; and
   comparing, via the processing circuitry each of the encrypted second plurality of subsets against one or more existing encrypted subsets stored in the plurality of data clouds.

4. The method of claim 3, further comprising:
   generating, via the processing circuitry a match table for each of the encrypted second plurality of subsets and a corresponding compatible existing encrypted subset stored in the plurality of data clouds.

5. The method of claim 4, further comprising:
   merging all of the matched tables from related identities across the plurality of data clouds;
   creating a tree from each matching pair table;
   calculating a matching score from all of the created trees; and
   returning a maximum score with its corresponding identification.

6. The method of claim 3, wherein the first pair table and the second pair table include a distance between and an orientation angle of each pair of respective first minutiae points and second minutiae points.

7. The method of claim 1, wherein each of the first plurality of subsets is encrypted via a revocable fingerprint biotoken.

8. The method of claim 1, further comprising:
   separating each subset of transformed biometric data into a plurality of quotients and a plurality of residuals;
   combining the plurality of quotients into a quotient integer;
   encoding the quotient integer; and
   combining the plurality of residuals into a residual integer.

9. The method of claim 8, wherein the allocating further comprises:
   uploading each of the plurality of residual integers into a corresponding plurality of data clouds; and
   uploading each of the encoded quotient integers into the corresponding plurality of data clouds.

10. A method of characterizing a fingerprint, the method comprising:
    receiving a fingerprint image at a fingerprint module;
    extracting a plurality of minutiae points from the fingerprint image, via a fingerprint image sensor;
    generating a minutiae file of biometric data according to a corresponding location of the plurality of minutiae points on the fingerprint image;
    generating a pair table from the minutiae file;
    dividing the pair table into a plurality of subsets;
    encrypting, via processing circuitry each of the plurality of subsets;
    comparing, via the processing circuitry each of the encrypted plurality of subsets against one or more existing encrypted subsets stored across a plurality of data clouds; and
    generating, via the processing circuitry a match table for each of the encrypted plurality of subsets and a corresponding compatible existing encrypted subset stored in the plurality of data clouds.

11. The method of claim 10, further comprising:
    merging all of the matched tables from related identities across the plurality of data clouds;
    creating a tree from each matching pair table;
    calculating a matching score from all of the created trees; and
    returning a maximum score with its corresponding identification.

12. The method of claim 10, further comprising:
    separating each subset of transformed biometric data into a plurality of quotients and a plurality of residuals;
    combining the plurality of quotients into a quotient integer;
    encoding the quotient integer; and
    combining the plurality of residuals into a residual integer.

13. The method of claim 10, wherein the pair table includes a distance between and an orientation angle of each pair of minutiae points.

14. A fingerprint matching system, comprising:
    processing circuitry configured to
      receive a fingerprint image at a fingerprint module;
      extract a plurality of minutiae points from the fingerprint image, via a fingerprint image sensor;
      generate a minutiae file of biometric data according to a corresponding location of the plurality of minutiae points on the fingerprint image;
      generate a pair table from the minutiae file;
      divide the pair table into a plurality of subsets;
      encrypt each of the plurality of subsets;
      compare each of the encrypted plurality of subsets against one or more existing encrypted subsets stored across a plurality of data clouds; and
      generate a match table for each of the encrypted plurality of subsets and a corresponding compatible existing encrypted subset stored in the plurality of data clouds.

15. The fingerprint matching system of claim 14, wherein the processing circuitry is further configured to:

merge all of the matched tables from related identities across the plurality of data clouds;
create a tree from each matching pair table;
calculate a matching score from all of the created trees; and
return a maximum score with its corresponding identification.

16. The fingerprint matching system of claim 14, wherein the processing circuitry is further configured to:
separate each subset of transformed biometric data into a plurality of quotients and a plurality of residuals;
combine the plurality of quotients into a quotient integer;
encode the quotient integer; and
combine the plurality of residuals into a residual integer.

17. The fingerprint matching system of claim 14, wherein the pair table includes a distance between and an orientation angle of each pair of minutiae points.

* * * * *

UNITED STATES PATENT AND TRADEMARK OFFICE
CERTIFICATE OF CORRECTION

PATENT NO. : 10,742,417 B2  
APPLICATION NO. : 16/166282  
DATED : August 11, 2020  
INVENTOR(S) : Bayan Taha Alzahrani et al.

Page 1 of 1

It is certified that error appears in the above-identified patent and that said Letters Patent is hereby corrected as shown below:

On the Title Page

Item (73) delete:
"King Abdulaziz University, Jeddah (SA); The Regents of the University of Colorado, a body corporated, Denver, CO (US)"

And insert:
-- King Abdulaziz University, Jeddah (SA); The Regents of the University of Colorado, a body corporate, Denver, CO (US) --

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*